April 25, 1967
K. LEWIS ET AL
3,315,812
FILTER DISK STRUCTURE
Filed Dec. 28, 1964
2 Sheets-Sheet 1
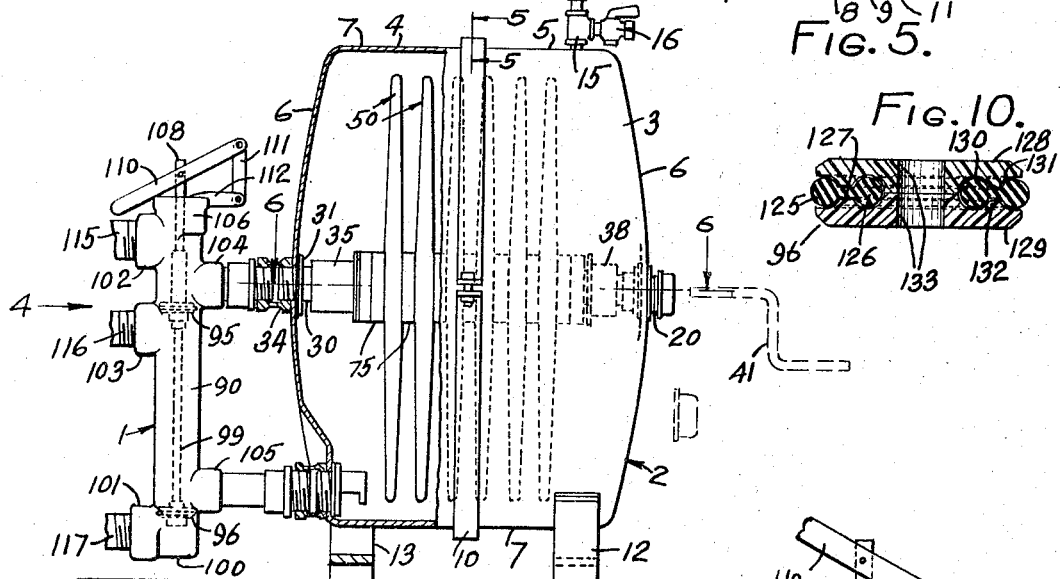
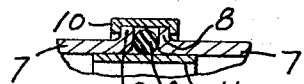
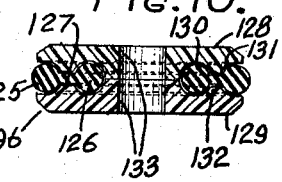
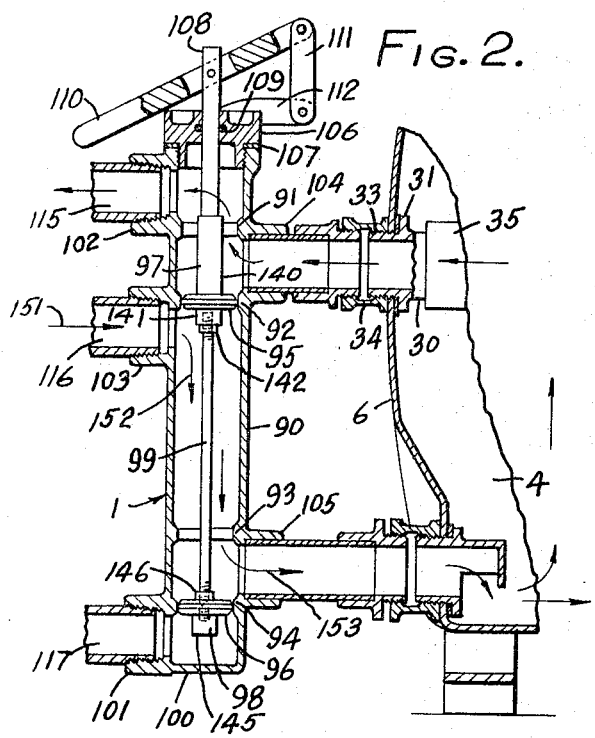
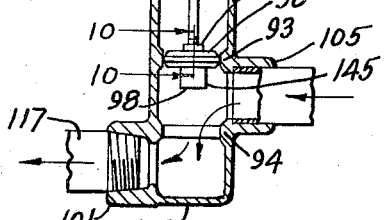
INVENTORS,
KENNETH LEWIS
BY WILMOT M. YETHS;
Calvin Brown
ATTORNEY April 25, 1967  K. LEWIS ET AL  3,315,812
FILTER DISK STRUCTURE
Filed Dec. 28, 1964  2 Sheets-Sheet 2
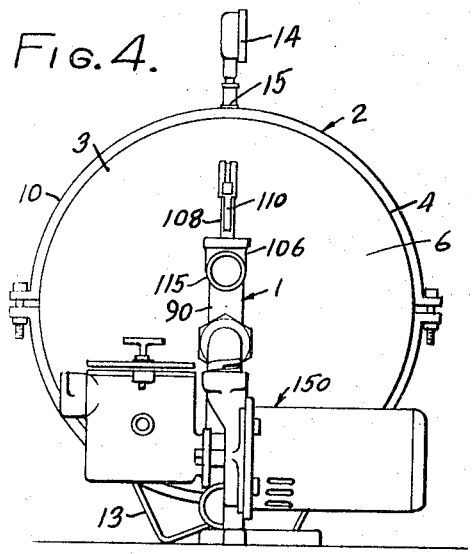
FIG. 4.
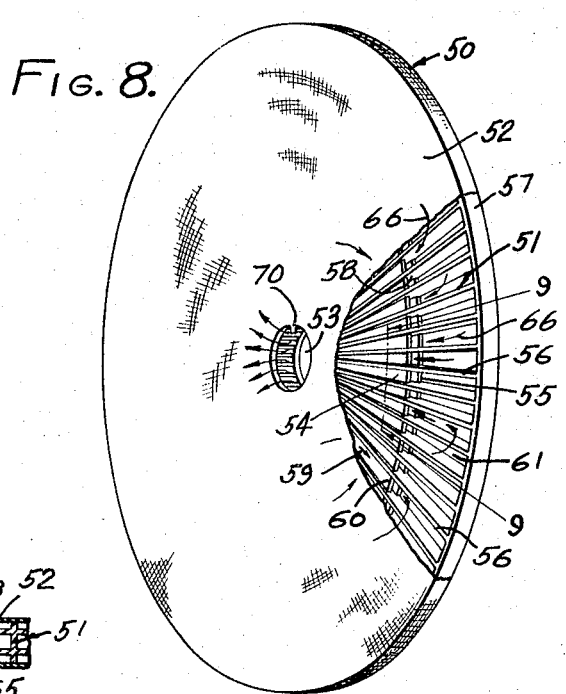
FIG. 8.
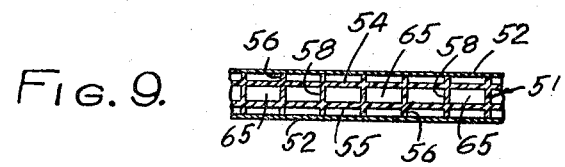
FIG. 9.
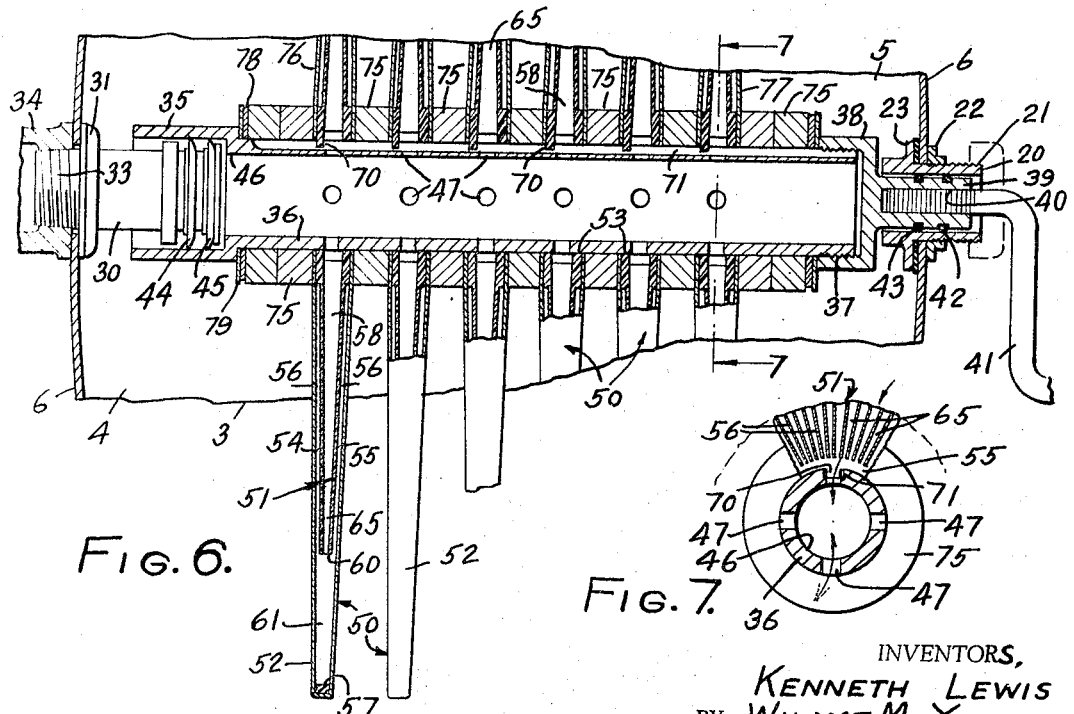
FIG. 6.
FIG. 7.
INVENTORS,
KENNETH LEWIS
BY WILMOT M. YETHS;
*Calvin Brown*
ATTORNEY United States Patent Office 3,315,812
Patented Apr. 25, 1967

3,315,812
FILTER DISK STRUCTURE
Kenneth Lewis, 8291 Lambert Drive, Huntington Beach, Calif. 92647, and Wilmot M. Yeths, 10407 Dorothy St., South Gate, Calif. 90280
Filed Dec. 28, 1964, Ser. No. 421,265
3 Claims. (Cl. 210—487)

The present invention constitutes an improvement on the invention of Kenneth Lewis for Swimming Pool Filter Device, No. 3,069,014, Dec. 18, 1962.

It has been found that a swimming pool filter device which incorporates a casing within which are spaced filter disks mounted upon a tubular shaft do not always function efficiently as to water flow and filter life. A filter disk comprises a fabric envelope and a septum within the same, the septum being mounted on a tubular shaft. Water from a pool when entering the tank or casing containing the filter disk contains debris and as a consequence it is ordinary practice to provide a filter aid material for the fabric envelope. The entrance water from the pool is under pump pressure and passes through the diatomaceous earth and the fabric envelope of each disk for passage into the tubular shaft. To this end the tubular shaft is provided with perforations so that clean water may enter within the tubular shaft for directed flow by suitable plumbing back to the pool.

It has been found that filter disks of the type mentioned allow a water flow of greater capacity at the center of the disks than at the outer edge or rim thereof with the consequence that the filter aid material has a thicker covering on the fabric envelope at the zone of greatest water flow; to wit, the center. As the disks are spaced apart a short distance, this greater water flow at the center permits a build up and a packing of the filter aid at the center between the disks. This renders cleaning of the filter disks difficult and, likewise, diminishes the filter area as the filter aid build up at the center cuts down the filter area. In other words, where there is a greater water flow there is a greater collection of filter aid.

An object of our invention is to provide a filter device incorporating filter disks wherein a build-up of filter aid material at the center of said disks is prevented and the filter aid is evenly distributed over the filter disks.

A further object is to provide a filter disk construction that directs the flow path of water in two directions.

A further object is the provision of a filter device of the type which includes filter disks having fabric filter envelopes covered by a filter aid and through which water from debris laden water is adapted to be passed to provide clean water within the envelope for passage back to the pool and wherein the flow of water through the envelope and filter aid is such as to maintain the filter aid material at a constant thickness over the envelope.

A further object is the provision of a device employing several spaced apart filter disks mounted on a tubular shaft and wherein each disk is provided with a fabric filter envelope adapted to be covered with the filter aid material and in which the filter aid material will not pack at the centers of the several disks or bridge between the disks.

With respect to the preceding object, the debris laden water from the swimming pool is under pump pressure and when the pump is shut off the filter aid material on the disks has a tendency to settle between the centers thereof. With our invention, the filter aid material cannot pack for the reason that there is no water flow at the centers of the disks as all water flow is outwardly from the centers of the disks with the result that the filter aid material is equally distributed over the fabric filters of the disks and easier to clean.

Other objects of the invention will be set forth as the specification proceeds.

In the drawing:

FIGURE 1 is a fragmentary partially sectional side elevation of the filter device and plumbing therefor;

FIGURE 2 is a fragmentary sectional view on an enlarged scale of back wash valve means for the filter device;

FIGURE 3 is a fragmentary enlarged sectional view of the flow valve of FIGURE 2, the parts being in moved position;

FIGURE 4 is an end elevation of the filter device of FIGURE 1, looking in the direction of the arrow 4;

FIGURE 5 is a fragmentary sectional view on an enlarged scale, on the line 5—5 of FIGURE 1;

FIGURE 6 is a fragmentary sectional enlarged view on the line 6—6 of FIGURE 1;

FIGURE 7 is a fragmentary sectional view on the line 7—7 of FIGURE 6;

FIGURE 8 is a fragmentary perspective view on an enlarged scale of one of the filter disks;

FIGURE 9 is a fragmentary enlarged sectional view on the line 9—9 of FIGURE 8; and, FIGURE 10 is an enlarged sectional view on the line 10—10 of FIGURE 3.

Referring to the drawings, the filter device or apparatus includes back wash valve means designated as an entirety by 1 and filtering means 2.

The filtering means 2 includes a suitable tank 3 formed from two cooperating parts 4 and 5. Each part is formed with a domed side wall 6 joined with a circular end wall 7, the end wall terminating in an outwardly turned flange 8. The flanges have placed therebetween an O-ring or other type gasket 9 and the flanges are held by an encircling channel clamping ring 10. An annular ring 11 bridges the interior of the two casing end walls, as shown in FIGURE 5 to render this portion of the device substantially fluid tight. Both parts of the casing are supported by feet 12 and 13. These feet may take any form found suitable such as the W form shown in FIGURE 4. A casing of the type just described is common in the industry and usually casings of this type are provided with an external pressure gauge 14 which has connection as at 15 with the interior of the casing. The connection 15 carries a relief pressure valve 16. A tubular shaft axially spans the two part casing and reference is made to FIGURE 6 wherein one casing half 5 has its side wall 6 formed with a hole to receive a sleeve 20 externally threaded at 21 to receive a lock nut 22, the sleeve formed with an annular flange 23 for holding a gasket against the inner surface of the side wall 6 and particularly when the lock nut 22 tightly engages the outer surface of said side wall 6. The side wall 6 of the part 4 of the casing is axially bored to receive a fitting in the form of a pipe 30 which pipe has a flange portion 31 bearing against a gasket positioned on the inner surface of side wall 6. The pipe 30 is screw threaded at 33 which portion extends through the bore of the casing part, the pipe being held in position by lock nut 34. The pipe extends inwardly of the casing part for reception within a collector manifold portion 35 of a tubular shaft 36 known as the clean water return run. As noted, the tubular shaft is provided at one end with the collector manifold 35 while the opposite end is externally screw threaded at 37 for screw threaded connection with an enlarged fitting or bell portion 38 which portion 38 has axially extending therefrom a stud shaft 39 positioned within the sleeve 20. The shaft 39 is provided with an axial angular sided bore 40 for receiving the shaft of a crank shaft 41 so that rotation of the crank shaft will rotate the tubular shaft. O-rings are provided at 42 and 43 for stud shaft 39 and engage the bore of the sleeve 30 to provide a fluid tight seal at this portion.

The pipe 30 and that portion thereof within the casing carries annular V type gaskets 44 and 45 which engage the inner wall of the collector manifold portion 35 to prevent fluid leak at this portion. The collector manifold portion of the tubular shaft; to wit, the bore portion of said shaft at 46, directly communicates with the bore of the pipe 30 so that fluid received within the tubular shaft will pass into pipe 30. In this regard, the tubular shaft is provided with a series of annularly spaced perforations designated generally as 47 and which perforations communicate with filter disks, to be described.

One of the filter disks is shown in FIGURE 8 at 50 and includes a septum or grid 51 enclosed within a fabric envelope 52. The fabric envelope is formed from suitable material such as a pre-shrunk Dacron polyester cloth. The center of the disk has a bore 53 and the tubular shaft 36 is passed through said bore, the construction being such that a separate series of annular perforations 47 communicate with the interior of each disk. The septum or grid 51 includes two annular imperforate disks 54 and 55 and radial ribs 46 which extend from the central bore 53 outwardly to a circular rim 57. There are a plurality of the ribs 56 and the width of each rib 56 varies from the central bore 53 to the rim 57 shown in FIGURE 6. Each rib is so formed to have a portion external each disk 54 and 55 and, likewise, a portion received between the two disks to act as a separator therefor as shown at 58. This construction provides flow paths for liquids externally of each disk 54 and 55 as indicated by the arrow at 59. The rim of each disk as shown at 60 is spaced from the rim 57 and this construction provides a free flow path for liquid between the ribs for the open ribbed annular zone designated at 61. The area covered by the annular zone 61 is substantially or approximately equal to the side areas of the disks 54 and 55. The inwardly divergent form of the ribs and the disks provides an enlarged width at bore 53. The two disks and the divergent form of the ribs acts to stabilize the disk assembly when received upon the shaft 36 and likewise, assures free and easy liquid flow. Thus, it is mentioned at this time that liquid passed through the filter envelope passes freely between the ribs at the annular area 61 and that the solid area formed from the center 53 to the rims of the disks 54 and 55 requires that liquid flow between the two disks is from the outer rims thereof to the center bore 53. This is to be particularly noted from FIGURE 9 which illustrates the flow paths for liquid as indicated at 65. It is to be particularly noted from FIGURE 9 that the rib portions which lie externally of the disks 54 and 55 space the fabric envelope from the disks 54 and 55 so that flow paths for liquid is at all times assured as well as the assurance that the liquid flow will pass between the two disks with entrance at the rims thereof as indicated for instance by the arrows 66 of FIGURE 8 which lead to the flow paths 65 of FIGURE 9.

In order to properly mount a series of disks upon the tubular shaft 36, each disk, and particularly the septum or grid, is provided with a key 70 projecting within the bore 53. The tubular shaft 36, in turn, is provided with an elongated axial groove or key way 71 for receiving the key 70 of each disk, and each disk is adapted to be so positioned that the space between the disks 54 and 55 directly communicates at the bore 53 with an annular series of perforations 47. The number of disks to be employed in a given filter device having previously been determined, spacer rings 75 are received upon the tubular shaft between the disks 50. The spacer rings are conveniently formed from any suitable material such as a vinyl plastic. Preferably the disks are spaced apart a distance of an inch to an inch and one-quarter and the end disks shown at 76 and 77 have spacer rings 75 bearing thereagainst. The outermost spacer ring in each instance has bearing thereagainst a gasket 78, washer 79 bearing against the gasket, the arrangement being such that all of the spacer rings, not only the end spacer rings but those between the disks are brought into pressure engagement with the disks when the screw threaded end 37 of the shaft 36 is tightened within the screw threads of part 38. This pressure engagement between the spacer rings and the disks is for the purpose of preventing any leak between the disks and the tubular shaft when the casing or tank 3 receives liquid to be filtered and which liquid is external the filter disks as all liquid to be filtered must pass through the filter envelopes and between the disks 54 and 55 for passage through the performations 47 into the tubular shaft.

For the purpose of conducting water to be filtered within the tank or casing 3, the back wash valve assembly shown at 1 in FIGURES 1 to 3 is utilized. This assembly includes stand pipe 90 provided internally at spaced points with valve seats 91, 92, 93 and 94 in axial relationship. Within the stand pipe are two disk valve assemblies 95 and 96 of identical construction. Suitable fittings 97 and 98 support the disk valves and an elongated stem 99 joins the fittings 97 and 98 to hold the disk valves spaced apart. The stand pipe is closed at its lower end 100 and between the base and the seat 94 and extending outwardly from the stand pipe is an external fitting 101. The stand pipe likewise has external fitting at 102 which is above the valve seat 91, a fitting at 103 which is below the valve seat 92 and fittings 104 and 105, the fitting 104 lying between the valve seats 91 and 92 while fitting 105 is intermediate the seats 93 and 94. The top of the stand pipe is provided with a secrew cap 106 which cap engages a gasket 107 at the top of the stand pipe. The fitting 97 has a stem 108 extending through the cap 106, which cap carries an O-ring 109 surrounding the stem 108 to prevent fluid leak between the cap and stem. The stem is secured to a lever 110 intermediate the lever length, the inner end of the lever being connected by a link 111 to an arm 112 which extends laterally from the cap 106.

Suitable fittings and pipes connect fitting 104 with the fitting 34 which leads to pipe 30, one end of which pipe 30 is in communication with the tubular shaft 36. The fitting at 105 for the stand pipe is in communication with piping and fittings with the interior of the casing or tank 3 at the base thereof. The clean water return to a swimming pool, not shown, may be by piping 115 connected to fitting 102 while piping 116 connected to the fitting 103 leads to the source of pool water to be cleared, while pipe 117 connected to fitting 101 leads to a sump for receiving dirty water.

The valves 95 and 96 are of identical construction and include a pair of spaced concentric O-rings 125 and 126 interconnected by an annular webbing 127. The O-rings are formed from suitable materials such as polyethylene. The O-rings are positioned between disks 128 and 129 formed from plastic or metal. Each disk is provided with an inner annular half-round groove 130 and an outer annular quarter-round groove 131. This construction provides for each disk and between the annular grooves thereof an annular ridge 132. The pair of interconnected O-rings are placed between the annular grooves of the disks while the ridge 132 for each disk positions the web 127 therebetween. The diameter of each disk is such that the rim portions thereof lie inwardly of an annular segment of the O-ring 125 for contact with the valve seats. Both disks are provided with axially aligned bores 133, for the fittings 97 and 98.

Referring to FIGURE 2, fitting 97 includes cylindrical parts 140 and 141 secured together by a threaded connection (not shown). Parts 140 and 141 hold valve disk 95 therebetween. Part 141 is threaded to stem 99 and held by lock nut 142. Fitting 98 is similar having cylindrical part 145 screwed to stem 99, with a lock nut 146 carried by the stem. Part 145 and nut 146 clamp the valve disk therebetween.

The operation, uses and advantages of the invention are as follows.

The motor driven pump and skimmer assembly shown in FIGURE 4 at 150 connects with a line leading to the pool and to the drain of the pool for drawing debris laden and dirty water from the pool and for directing it through the pipe 116 into the stand pipe 90 as shown in FIGURE 2 and indicated by the arrows 151, 152 and 153. When the valves 95 and 96 are in the position shown for FIGURE 2, the debris laden water is received within the casing or tank 3 at the bottom thereof. This water initially contains a filter aid material which covers the fabric filter of the disks. Thus the debris laden water must pass through the filter aid and the fabric filter 52 and enter between the disks 54 and 55 at the rims thereof into the passageway between the disks, as shown by the arrows at 66 in FIGURE 8. The water may pass between the ribs and the open area 56 but must enter between the two disks 54 and 55. The water which is now clean due to filtering action is received between the radial ribs at the center 53, thence due to the spacing of the disks by the spacer rings passed through the perforations 47 into the tubular shaft 36, pipe 30, stand pipe 90, pipe 115 which returns to the pool to deliver clean water thereto. The water will, therefore, move outwardly toward the rim of the septum and then inwardly between the septum disks, as shown by the arrows at 59 and 66. The open area 56 and the imperforate disk portions 54 and 55 are substantially equal in area and all water must flow between the two disks in order to enter the tubular shaft 36. Such action tends to equalize water flow and maintains the filter aid material at a constant thickness over the filter envelope. When the pump 150 is shut off, some of the filter aid will settle toward the centers of the disks. However, this presents no difficulty to the efficient operation of the present filter device, and no packing of the filter aid will occur at the disk centers as water flow is in two directions; to wit, away from the center of the disks and inward between the disks at the rims thereof. The means for packing ends of the tubular shaft and, likewise, use of the spacer rings between the different filter disks assurs that dirty water will not mix with clean water.

When it is desired to backwash, the lever 110 may be moved to the position shown in FIGURE 3 which will raise the valves 95 and 96 from the seated position of FIGURE 2 and direct water under pump pressure through the fittings and pipe lines into the tubular shaft and thence into the filter and outwardly thereof. Fitting part 97 strikes cap 106 when lever 110 is in the position of FIGURE 3 and correctly relates the valve disks to valve seats 91 and 93. The part 145 may have a length which causes it to strike end 100 to position the valves as shown in FIGURE 2 when handle 110 is lowered.

The valve construction shown in FIGURE 10 is important. When the outer O-ring 125 pressure engages a seat in the stand pipe, the first tendency is to roll the O-ring due to frictional engagement thereof with a seat. Under ordinary circumstances this would pull the O-ring from between the disks 128 and 129. However, by providing the second concentric O-ring 126 with the web connection between the two O-rings, the tendency to roll and dislodge the valve seat engaging O-ring 125 from its position between the disks is effectively prevented. Proper functioning of the disk valves and the seating thereof by slide fit engagement with the valve seats is, therefore, assured.

In the molding of the septum or grid, we have found acrylonitrile butadiene styrene to be an acceptable material as it molds easily, does not warp, and has high impact resistance. The septum may be molded in two identical parts, then secured together by cementing.

We claim:

1. In filter apparatus: a filter disk comprising a septum and a fabric envelope enclosing the septum, said septum formed with an axial opening for mounting the septum on a tubular shaft, said septum having a pair of imperforate spaced apart annular disks extending from the axial opening in the septum outwardly therefrom, rib members formed on the exterior surface of each imperforate disk, and extending beyond the rim portions of said imperforate disks, an encircling band joining the outer rib ends to provide an annular open area between the encircling band and the rim portions of the imperforate disks, the side areas of said imperforate disks and of said annular open area being substantially equal.

2. The filter disk as set forth in claim 1, said ribs likewise extending between the imperforate disks from the rims thereof to the axial opening for the septum.

3. The filter disk as set forth in claim 2, and said latter ribs increasing in width from the rims to the axial opening.

References Cited by the Examiner

UNITED STATES PATENTS

| | | | |
|---|---|---|---|
| 2,770,510 | 11/1956 | Collins | 92—250 |
| 3,019,905 | 2/1962 | Baker et al. | 210—331 X |
| 3,252,575 | 5/1966 | Jacuzzi | 210—425 X |

FOREIGN PATENTS

| | | |
|---|---|---|
| 511,079 | 1/1955 | Italy. |

REUBEN FRIEDMAN, *Primary Examiner.*

W. S. BRADBURY, *Assistant Examiner.*